(12) United States Patent
Saville et al.

(10) Patent No.: US 6,354,741 B1
(45) Date of Patent: Mar. 12, 2002

(54) FOIL THRUST BEARING

(75) Inventors: Marshall Patton Saville, Torrance; Utpal Mahesh Koppikar, Woodland Hills, both of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/379,823

(22) Filed: Aug. 24, 1999

Related U.S. Application Data

(63) Continuation-in-part of application No. 09/235,849, filed on Jan. 22, 1999.
(60) Provisional application No. 60/119,581, filed on Feb. 10, 1999.

(51) Int. Cl.$^7$ ............................................... F16C 32/06
(52) U.S. Cl. ........................ 384/105; 384/106; 384/124
(58) Field of Search ................................ 384/103, 105, 384/106, 124

(56) References Cited

U.S. PATENT DOCUMENTS

| 4,247,155 A | 1/1981 | Fortmann |
| 4,262,975 A | 4/1981 | Heshmat et al. |
| 4,277,111 A | 7/1981 | Gray et al. |
| 4,277,113 A | 7/1981 | Heshmat |
| 4,300,806 A | 11/1981 | Heshmat |
| 4,315,359 A | 2/1982 | Gray |
| 4,331,365 A | 5/1982 | Miller, Jr. |
| 4,459,047 A | 7/1984 | Silver |
| 4,597,677 A | 7/1986 | Hagiwara et al. |
| 4,621,930 A | 11/1986 | Gu et al. |
| 4,624,583 A | 11/1986 | Saville et al. |
| 4,668,106 A | 5/1987 | Gu |
| 4,682,900 A | 7/1987 | Gu |
| 4,871,267 A | 10/1989 | Gu |
| 5,110,220 A | 5/1992 | Gu |
| 5,116,143 A | 5/1992 | Saville et al. |
| 5,248,205 A | 9/1993 | Gu et al. |
| 5,318,366 A | 6/1994 | Nadjafi |
| 5,547,286 A | 8/1996 | Struziak |
| 5,902,049 A | 5/1999 | Heshmat |
| 5,911,511 A | 6/1999 | Saville |

Primary Examiner—Charles A Marmor
Assistant Examiner—Saúl Rodrigues
(74) Attorney, Agent, or Firm—William J. Zak, Jr., Esq.

(57) ABSTRACT

An improved foil thrust bearing includes a pair of members arranged for relative rotation with respect to one another. One of the pair of members is adapted to rotatably support the other. A thrust bearing disk is operatively disposed between the pair of relatively rotatable members. The thrust bearing disk has a plurality of diverging surface ramps. The surface ramps can comprise an inner ramp and an outer ramp. The thrust bearing disk can also comprise a plurality of radial slots. A plurality of separately formed, converging surface compliant foils are disposed on the thrust bearing disk and between the ramps. An underspring element is operatively disposed between the thrust bearing disk and one of the rotatable members, with the underspring element having a plurality of alternating upper and lower ridges.

18 Claims, 4 Drawing Sheets

FIG. 6
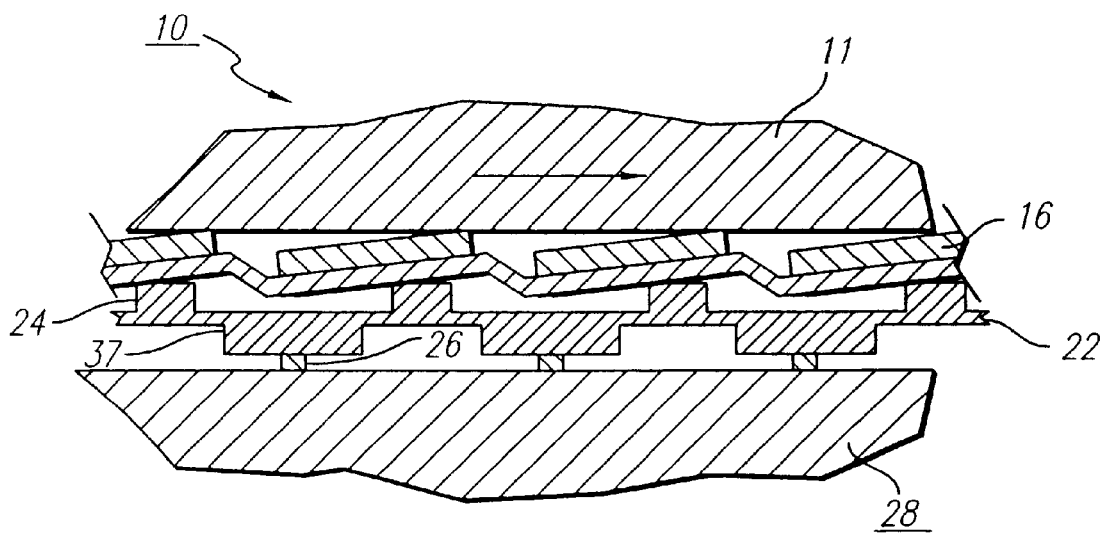
FIG. 7
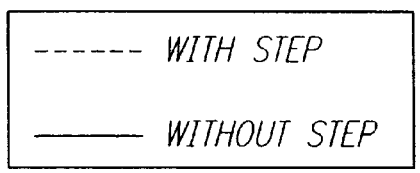
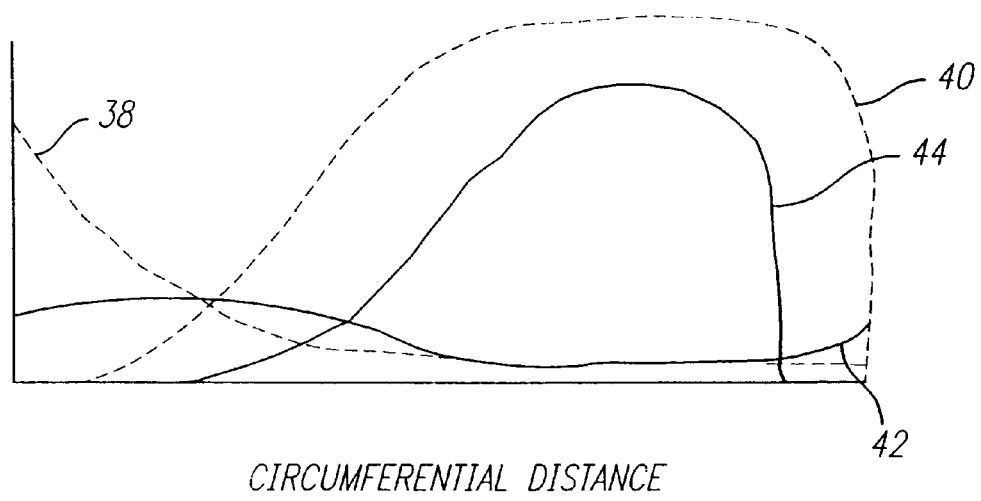
CIRCUMFERENTIAL DISTANCE

FOIL THRUST BEARING

CROSS REFERENCE TO RELATED APPLICATIONS

This application is a continuation-in-part of an application filed on Jan. 22, 1999, Ser. No. 09/235,849.

This application also claims the benefit of U.S. Provisional Application filed Feb. 10, 1999, Ser. No. 60/119,581.

BACKGROUND OF THE INVENTION

The present invention generally relates to bearings and, more particularly, to foil thrust bearings.

The ready availability of ambient atmosphere as a bearing fluid makes fluid bearings particularly attractive for high speed rotating machinery. Some applications might include, for example, a turboalternator-generator and turbocompressor.

Fluid bearings generally comprise two relatively rotatable members (i.e., a bearing and a runner). A predetermined spacing between the bearing and runner is filled with a fluid such as air. Foils (or thin sheets of a compliant material) disposed in the spacing are deflected by the hydrodynamic film forces between the adjacent bearing surfaces. The foils thus enhance the hydrodynamic characteristics of the fluid bearing and also provide improved operation under extreme load conditions when normal bearing failure might otherwise occur. Additionally, these foils provide the added advantage of accommodating eccentricity of the relatively movable members and further provide a cushioning and dampening effect.

To properly position the foils between the movable bearing members, it has been common to mount a plurality of individually spaced foils on a foil or thrust bearing disk and position the disk on one of the bearing members. Another common practice has been to provide separate compliant stiffener elements or undersprings beneath the foils to supply the required compliance. Examples of typical foil thrust bearings are shown in U.S. Pat. Nos. 5,547,286; 4,871,267; 4,682,900; 4,668,106; 4,624,583; 4,621,930; 4,597,677; 4,459,047; 4,331,365; 4,315,359; 4,300,806; 4,277,113; 4,277,111; and 4,247,155.

Notwithstanding the inclusion of the above design characteristics, the load capacity of a foil thrust bearing still depends on the compliance of the bearing with pressure exerted by a fluid film developed between the bearing and the runner. The pressure profile for a thrust bearing varies, and in order to accommodate the optimal pressure profile and attendant fluid film thickness associated with maximum load capacity, the thrust bearing should be designed to provide a fluid film that correlates to the pressure profile.

To correlate the fluid film with the varying pressure profile, the shape of the fluid film can be altered. Such alteration can be primarily achieved by varying the design of three components—namely, the thrust bearing disk, the foils supported by the thrust bearing disk, and the underspring element or thrust bearing stiffener that supports the thrust bearing disk. However, a design variation in one of the three components can have a performance impact on one or both of the other two components—either advantageously or disadvantageously. Accordingly, if two (and even three) of the components are altered in design, the ability to predict the performance impact (either positively or negatively) on the thrust bearing decreases more than linearly.

As can be seen, there is a need for an improved foil thrust bearing. In particular, there is a need for a foil thrust bearing that provides improved performance, including increased load capacity. A further need is for a thrust bearing that has increased fluid film pressure to increase the load capacity. Also needed is an improved thrust bearing that includes a fluid film shape that better correlates to the pressure profile. Another need is for a thrust bearing that has increased damping for increased vibration load capability.

SUMMARY OF THE INVENTION

In an improved foil thrust bearing, the present invention provides a pair of members arranged for relative rotation with respect to one another, one of the members being adapted to rotatably support the other; a thrust bearing disk operably disposed between the relatively rotatable members, with the thrust bearing disk having at least one surface ramp and at least one separately formed foil disposed on the thrust bearing disk.

Also, in another improved foil thrust bearing, the present invention provides a pair of members arranged for relative rotation with respect to one another, one of the members being adapted to rotatably support the other; a thrust bearing disk operatively disposed between the relatively rotatable members, with the thrust bearing disk having a plurality of radial slots, a plurality of surface ramps, and a plurality of separately formed foils disposed on the thrust bearing disk and between the ramps; and an underspring element operatively disposed between the thrust bearing disk and one of the rotatable members, with the underspring element having a plurality of alternating upper and lower ridges.

These and other features, aspects and advantages of the present invention will become better understood with reference to the following drawings, description and claims.

BRIEF DESCRIPTION OF THE DRAWINGS

FIG. 6 is a cross sectional view of a foil thrust bearing according to another embodiment of the present invention; and FIG. 7 is a plot of fluid film pressure versus circumferential distance, and fluid film shape versus circumferential distance, for the foil thrust bearing shown in FIG. 1 and a prior art design.

DETAILED DESCRIPTION OF THE INVENTION

Figure 1:
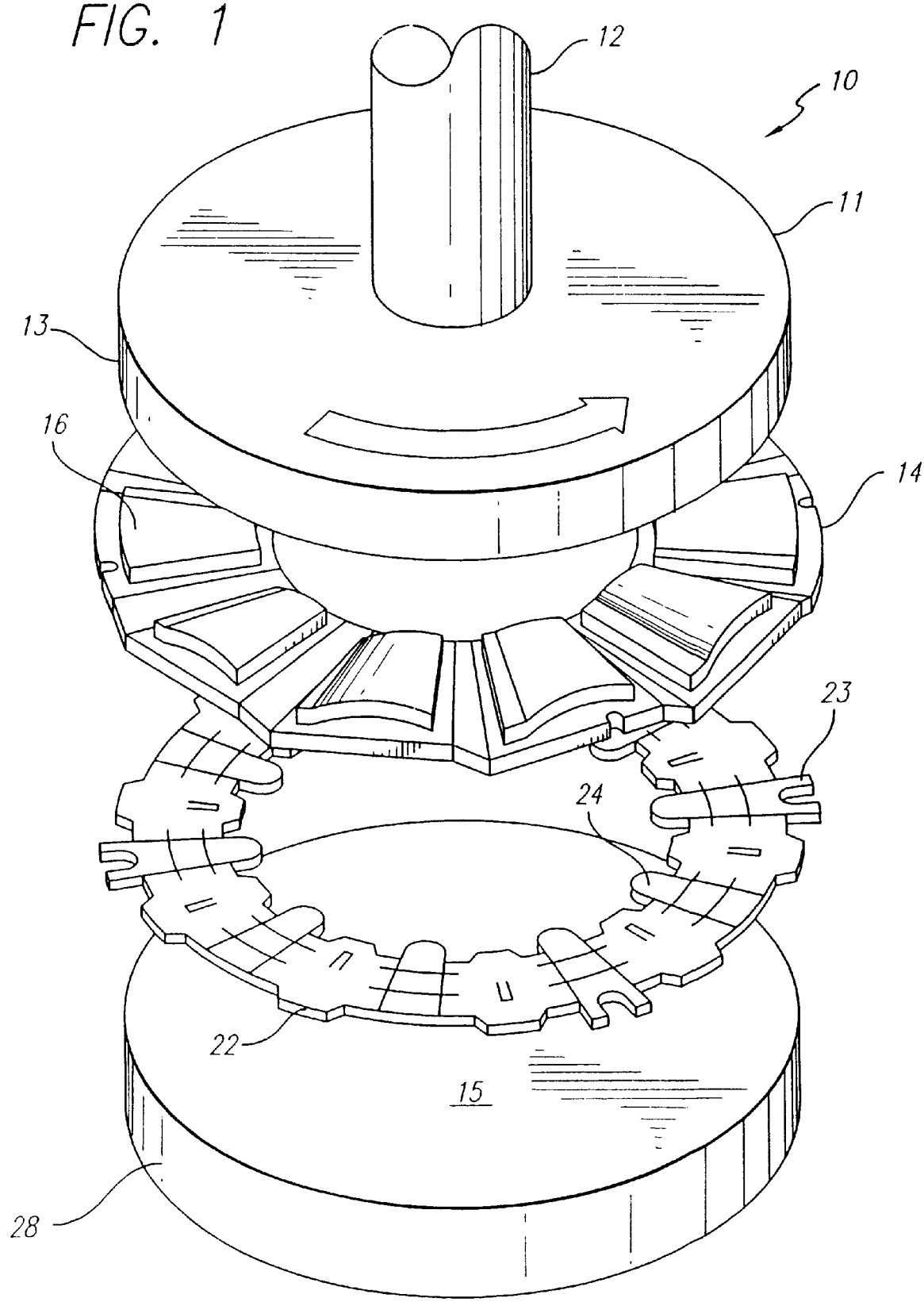
FIG. 1 is an exploded view of a foil thrust bearing according to one embodiment of the present invention.

FIG. 1 shows a foil thrust bearing 10 according to one embodiment of the present invention. The bearing 10 generally comprises the components of a thrust runner 11, a thrust bearing disk 14, an underspring element or thrust bearing stiffener 22, and a thrust plate 28. The above components are typically constructed of nickel-based alloys. While various applications for the bearing 10 are within the scope of the present invention, the bearing 10 is considered to have particular benefit in high speed rotating machinery, such as turbo-generators and turbocompressors.

In more particularly describing a first embodiment of the present invention, it can be seen in FIG. 1 that the thrust runner 11 is engaged to a rotating shaft 12, thereby causing the runner 11 to rotate in the direction of the arrow shown in FIG. 1. The runner 11 includes a runner surface 13 that faces opposite a bearing surface 15 of the thrust plate 28. Intermediate the runner 11 and thrust plate 28 is the thrust bearing disk 14 and an underspring 22.

In this embodiment of the present invention (FIG. 2), the bearing disk 14 has an overall stepped configuration and is of the type shown in U.S. Pat. No. 4,624,583. However, in contrast to U.S. Pat. No. 4,624,583, a plurality of bearing pads or foils 16 in the present invention are not integrally formed with the bearing disk 14. Instead, the pads 16 are separately formed and affixed along one side (e.g., a leading edge 17 as discussed below) to the bearing disk 14, such as by welding. A similar pad construction is shown in U.S. Pat. No. 4,668,106. But the use of separately formed pads 16 for the bearing disk shown in U.S. Pat. No. 4,624,583 is, in fact, opposite to the teaching therein. Specifically, U.S. Pat. No. 4,624,583 teaches that it is disadvantageous to use individual foils or pads (col. 1, lines 43 to col. 2, line 17), at least from a cost perspective.

Figure 2:
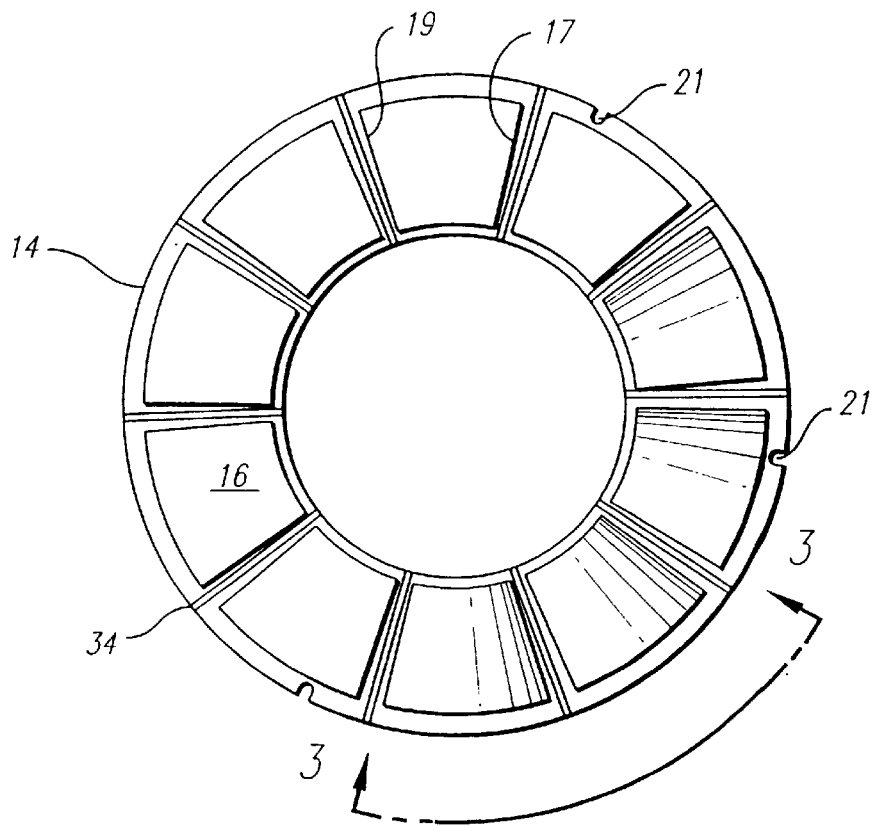
FIG. 2 is a plan view of a thrust bearing disk which can be used in the foil thrust bearing shown in FIG. 1.
Figure 3:
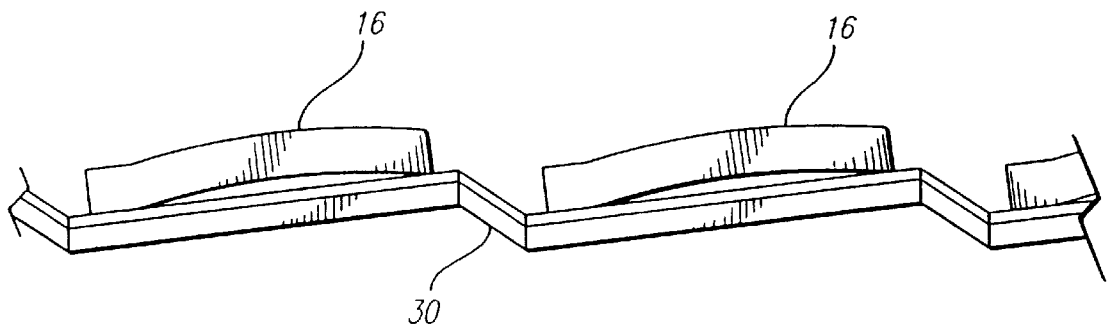
FIG. 3 is a cross sectional view of the thrust bearing disk taken across line 3—3 of FIG. 2.
Figure 5:
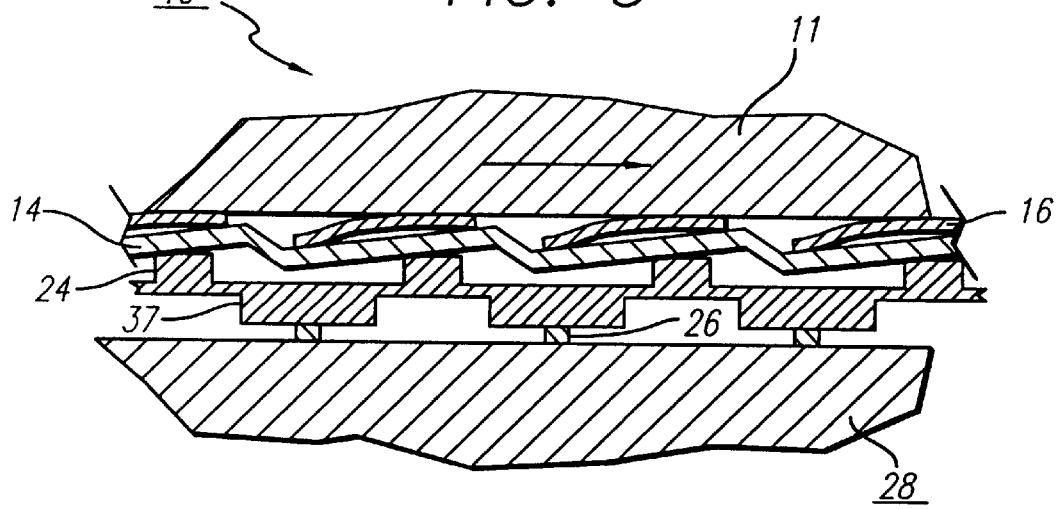
FIG. 5 is a cross sectional view of the thrust bearing disk taken across line 5—5 of FIG. 4.

As depicted in FIG. 2, each of the separately formed pads 16 are substantially annular sector in shape, although other shapes may be employed such as trapezoidal. The surface of the foils 16 can have a slight crown (FIG. 5) or can be relatively flat (FIG. 6) depending upon the desired operating characteristics. The pads 16 are circumferentially positioned about the entire surface of the bearing disk 14 that faces the runner surface 13. Thereby, each pad 16 is described by a leading edge 17 and a trailing edge 19, as the runner 11 rotates in the direction shown in FIG. 1. While the present embodiment shows the pads 16 as being substantially equidistant from one another in a circumferential direction, the present invention envisions that unequal spacing may be used. Further, even though FIG. 2 depicts ten (10) pads 16 being employed, the present invention envisions that more or less than ten pads 16 may be useful.

Figure 4:
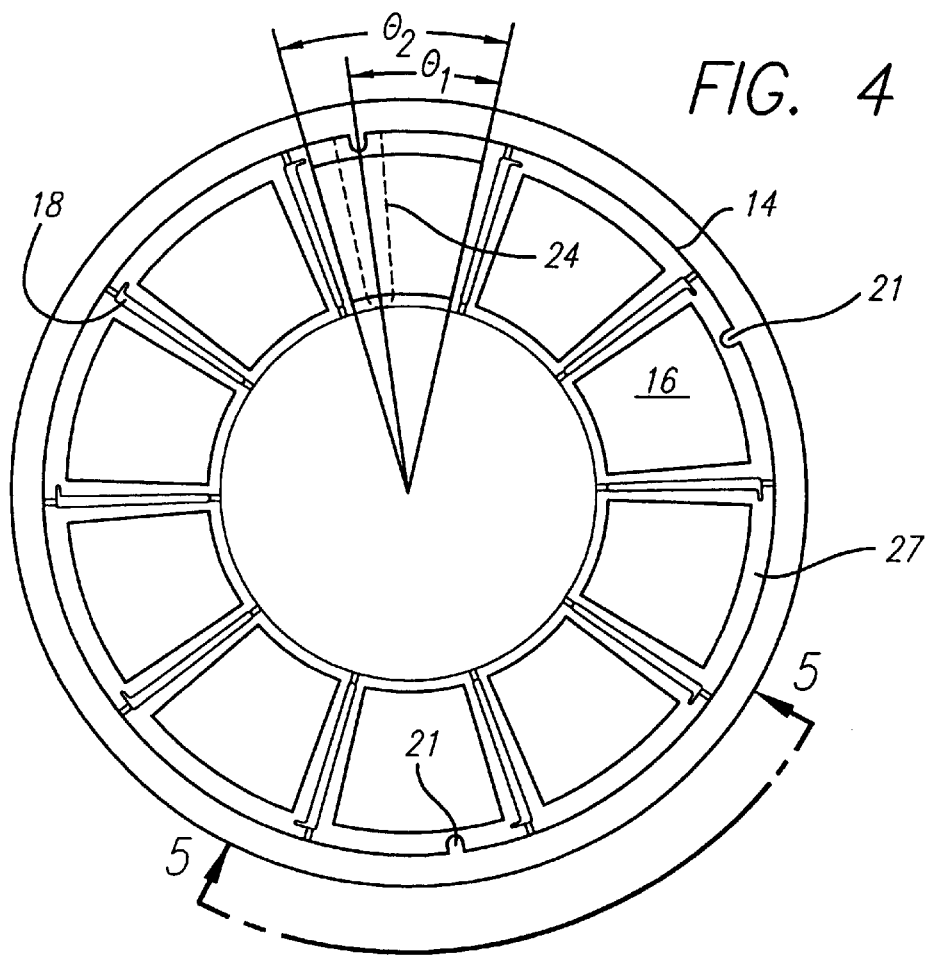
FIG. 4 is a plan view of a thrust bearing disk according to another embodiment of the present invention which can be used in the foil thrust bearing shown in FIG. 1.

In contrast to the embodiment of FIG. 2, the pads or foils 16 can be alternately positioned with a plurality of slots 18 in the bearing disk 14, as seen in the alternative embodiment shown in FIG. 4. Accordingly, and for such alternative embodiment, one pad 16 is alternately positioned with one slot 18. The function of the slots 18 is to allow a substantially unrestricted flow of fluid (i.e., air) to pass through the bearing disk 14 and form a fluid film between the runner surface 13 and the bearing surface 15. In this alternative embodiment, all of the slots 18 are of an L-shaped configuration. Yet, it can be appreciated that all of the slots 18 can be of other configurations, such as U-shaped. Further, the slots 18 need not be of the same configuration, and can be varied from one another. Additionally, a plurality of radially aligned holes or slots may be used to form the slots 18.

In referring again to the embodiment of the thrust bearing disk 14 shown in FIGS. 1 and 2, surface ramps or transition areas 30 extend between adjacent foils 16. Overall, the ramps 30 provide the bearing disk with a stepped configuration. The individual ramps 30 have a diverging configuration when viewed from an outer diameter of the bearing disk 14 and to an inner diameter. The diverging configuration is due to the converging configuration of the foils 16 when viewed from the outer diameter to the inner diameter of the bearing disk 14. Thus, the bearing disk 14 provides alternately converging foils 16 and diverging surface ramps 30. It can be appreciated that the configuration of the ramps 30 can change depending upon the shape of the foils 16. Further, the ramps 30 need not all be of the same configuration.

Similarly, in the embodiment of the bearing disk 14 having slots 18, ramps 30 extend between the inner diameter of the disk 14 and one of the distal ends of the slots 18. Ramps 30 also extend between the outer diameter of the disk 14 and the other distal end of the slot 18. Generally, the ramps 30 are radially aligned with the slots 18. Again, the ramps 30 have a diverging configuration when the foils 16 have a converging configuration.

With respect to various embodiments of the bearing disk 14 above, it should be recognized that the ramps 30 can be provided at the outer diameter, inner diameter or both. Further, there may be applications where the extent or degree of divergence and/or the length of the inner ramps 30 adjacent the inner diameter (and thus the ramp height) may vary from the degree of divergence and/or the length of the outer ramps 30 adjacent the outer diameter. Likewise, the degree of divergence and/or the length of the ramps 30 can be varied along the radial direction. The actual angle or degree of divergence and height of the ramps 30 can be varied to provide for particular operating conditions. The height of the individual ramps 30 would typically be between 0.0005 to 0.010 inches with a preferred range of 0.001 to 0.002 inches.

The bearing disk 14 further includes a plurality of notches 21 positioned about the outer or circumferential edge of the bearing disk 14 (FIG. 2). The notches 21 can be aligned with a plurality of notches 23 of the underspring element 22 to fix the rotational position of the disk 14 to the underspring 22, as further described below.

In the embodiment shown in FIG. 1, the underspring element 22 comprises a plurality of upper ridges 24 and lower ridges 26. All of the upper ridges 24 of the underspring 22 have substantially the same configuration and dimensions, as do the lower ridges 26. Nevertheless, it is contemplated by the present invention that all of the upper ridges 24 and lower ridges 26 need not respectively be of the same configuration and dimensions. Further, although different spacing can be employed, the present embodiment has the upper ridges 24 and lower ridges 26 substantially equidistant from one another in their circumferential positions. In making the underspring or stiffener 22 of the present invention, conventional methods can be utilized. For example, most of the underspring 22, including the ridges 24,26, can be stamped.

The underspring 22 is shaped to substantially match the configuration and dimensions of the bearing disk 14. FIG. 4 depicts the relative position of the upper ridges 24 of the underspring 22 with respect to the foils 16 of the thrust bearing disk 14. The angle $\theta_1$ is defined between the radial line extending from the base of the ramps 30 (i.e., the leading edge 17 of the foil 16) and the radial centerline of the upper ridge 24. The angle $\theta_2$ is defined between the leading edge 17 of the foil 16 and the trailing edge 19 of the foil 16. In order to provide the proper pre-load and support for the individual foils 16, the relationship between $\theta_1$ and $\theta_2$ should be approximately 2:3 to provide optimum results in most operating conditions. It should be understood, however, that the relationship between $\theta_1$ and $\theta_2$ range can be from approximately 1:2 to almost 1:1.

Notwithstanding the foregoing, the present invention contemplates that other designs of an underspring element 22 can be employed. As in U.S. Pat. No. 5,110,220, which is incorporated herein by reference, the underspring element 22 can have a plurality of spring sections. Each spring section includes a plurality of corrugated spring elements arranged radially adjacent to one another and traversing radially increasing arc lengths. The pitch of the corrugations in the spring elements increases from the outermost to the innermost spring element. Like in U.S. Pat. No. 5,248,205, which is incorporated herein by reference, the underspring element 22 can include a plurality of trapezoidal areas. From the leading edge of each area and towards but not to the trailing edge extend a plurality of corrugated arcuate springs. Each spring may contain a plurality of slots extending circumferentially and radially over the spring. Alternatively, the underspring element 22 can be formed, as shown in U.S.

Pat. No. 5,318,366 and incorporated herein by reference, whereby trapezoidal areas are provided. From the trailing edge of each area and towards but not to the leading edge extend a plurality of corrugated arcuate springs. The springs are defined by widths that increase from the innermost spring to the outermost spring. Also, the width of each individual spring decreases from the trailing edge and towards the leading edge.

When the foil thrust bearing 10 is operative, the shaft 12 rotates and the runner 11 likewise rotates. As the runner 11 rotates, a fluid film is built up between the runner surface 13 and the bearing surface 15. For each of the pads or foils 16, the fluid film pressure increases from the leading edge 17 and to the trailing edge 19. At the same time, each of the upper ridges 24 provides load support to their respective pads 16.

FIG. 7 depicts fluid film shape versus circumferential distance about the bearing disk 14, as curve 38, for a preferred embodiment of the present invention. In conjunction with curve 38, curve 40 depicts fluid film pressure versus circumferential distance. In contrast, curve 42 depicts a fluid film shape and curve 44 depicts a fluid film pressure, both for a prior art design that does not have a stepped configuration to the thrust bearing disk of a foil thrust bearing. As can be seen, a comparison between film shape curves 38 and 42 indicate excessive gap near the trailing edge and insufficient gap near the leading edge in the prior art design. A comparison of pressure curves 40 and 44 indicates that the present invention provides greater film pressure.

To those skilled in the art, it can be appreciated that the present invention provides an improved foil thrust bearing and, specifically, increased performance, including increased load capacity. The present invention provides increased fluid film pressure to increase the load capacity. Another advantage provided by the present invention is increased damping for improved vibration load capability. The increased damping is realized through coulomb friction and squeeze film forces from the relative motion between the pad and disk interface.

It should be understood, of course, that the foregoing relates to preferred embodiments of the invention and that modifications may be made without departing from the spirit and scope of the invention as set forth in the following claims.

We claim:

1. A foil thrust bearing comprising:
   a pair of members arranged for relative rotation with respect to one another, one of said members being adapted to rotatably support the other;
   a thrust bearing disk operably disposed between said relatively rotatable members, said thrust bearing disk having a stepped configuration and at least one surface ramp; and
   at least one separately formed surface compliant foil disposed on said thrust bearing disk.

2. The foil thrust bearing of claim 1, further comprising an underspring element operatively engaged to said thrust bearing disk.

3. The foil thrust bearing of claim 1, wherein said thrust bearing disk further comprises both an inner surface ramp and an outer surface ramp.

4. The foil thrust bearing of claim 1, wherein said thrust bearing disk further comprises a radial slot.

5. A foil thrust bearing comprising:
   a pair of members arranged for relative rotation with respect to one another, one of said members being adapted to rotatably support the other;
   a thrust bearing disk operatively disposed between said relatively rotatable members, said thrust bearing disk having a stepped configuration and a plurality of surface ramps;
   a plurality of separately formed, surface compliant foils disposed on said thrust bearing disk and between said ramps; and
   an underspring element operatively disposed between said thrust bearing disk and one of said rotatable members.

6. The foil thrust bearing of claim 5, wherein said surface ramps comprise both inner ramps and outer ramps.

7. The foil thrust bearing of claim 6, wherein said inner ramps are disposed adjacent an inner diameter of said thrust bearing disk and said outer ramps are disposed adjacent an outer diameter of said thrust bearing disk.

8. The foil thrust bearing of claim 5, wherein said surface ramps consist of outer ramps.

9. The foil thrust bearing of claim 8, wherein said thrust bearing disk further comprises a plurality of slots adjacent said outer ramps.

10. The foil thrust bearing of claim 5, wherein said thrust bearing disk further comprises a plurality of slots.

11. The fluid thrust bearing of claim 10, wherein said slots have a configuration selected from the group consisting of a U-shape, an L-shape, a plurality of radially aligned slots, and a plurality of radially aligned holes.

12. A foil thrust bearing comprising:
   a pair of members arranged for relative rotation with respect to one another, one of said members being adapted to rotatably support the other;
   a thrust bearing disk operatively disposed between said relatively rotatable members, said thrust bearing disk having a plurality of diverging surface ramps and a radial slot that is L-shaped;
   a plurality of separately formed, converging surface compliant foils disposed on said thrust bearing disk and between said ramps; and
   an underspring element operatively disposed between said thrust bearing disk and one of said rotatable members, said underspring element having either a plurality of alternating upper ridges and lower ridges or a plurality of corrugated spring elements.

13. The fluid thrust bearing of claim 12, wherein said radial slot comprises a plurality of radially aligned slots.

14. The fluid thrust bearing of claim 12, wherein said radial slot comprises a plurality of radially aligned holes.

15. The fluid thrust bearing of claim 12, wherein said surface ramps comprise inner ramps disposed adjacent an inner diameter of said thrust bearing disk.

16. The fluid thrust bearing of claim 12, wherein said surface ramps comprise outer ramps disposed adjacent an outer diameter of said thrust bearing disk.

17. The fluid thrust bearing of claim 12, wherein one of said upper ridges is at an operative position to one of said foils.

18. The fluid thrust bearing of claim 17, wherein said operative position is defined by $\theta_1$ and $\theta_2$, wherein $\theta_1$ is defined as an angle between a radial line extending from a leading edge of said foils and a radial centerline of said upper ridges, $\theta_2$ is defined as an angle between said leading edge and a trailing edge of said foils, and the ratio of $\theta_1$ and $\theta_2$ is between about 1:2 and 1:1.

* * * * *